US007065592B2

(12) United States Patent
Amarger et al.

(10) Patent No.: US 7,065,592 B2
(45) Date of Patent: Jun. 20, 2006

(54) METHOD AND DEVICE FOR MANAGING THE RESOURCES OF A COMPUTER COMMUNICATION MEANS FOR PROCESSING A COMPUTER DOCUMENT

(75) Inventors: Stephane Amarger, Chaville (FR); Jean-Jacques Moreau, Rennes (FR); Isabelle Morvan, Rennes (FR); Lionel Tocze, Saint Domineuc (FR)

(73) Assignee: Canon Research Centre France S.A. (FR)

( * ) Notice: Subject to any disclaimer, the term of this patent is extended or adjusted under 35 U.S.C. 154(b) by 1073 days.

(21) Appl. No.: 09/756,702

(22) Filed: Jan. 10, 2001

(65) Prior Publication Data

US 2003/0035122 A1 Feb. 20, 2003

(30) Foreign Application Priority Data

Jan. 24, 2000 (FR) .................................. 00 00854

(51) Int. Cl.
 *G06F 13/12* (2006.01)
(52) U.S. Cl. .............................. 710/72; 710/3; 710/12; 710/33; 709/220; 709/223
(58) Field of Classification Search ................... 710/3, 710/12, 13, 14, 31, 33, 62, 72

See application file for complete search history.

(56) References Cited

U.S. PATENT DOCUMENTS

| 5,467,432 | A | | 11/1995 | Ota ............................ 395/112 |
| 5,574,979 | A | * | 11/1996 | West .......................... 455/63.1 |
| 5,580,177 | A | | 12/1996 | Gase et al. ................... 400/61 |
| 5,642,303 | A | * | 6/1997 | Small et al. ................. 708/109 |
| 5,848,418 | A | | 12/1998 | de Souza et al. ........... 707/102 |
| 6,452,692 | B1 | * | 9/2002 | Yacoub ...................... 358/1.15 |
| 6,552,813 | B1 | * | 4/2003 | Yacoub ...................... 358/1.1 |
| 6,574,452 | B1 | * | 6/2003 | Morvan et al. ............. 455/11.1 |
| 2002/0075509 | A1 | * | 6/2002 | Wiechers ................... 358/1.15 |

FOREIGN PATENT DOCUMENTS

| EP | 532796 | 12/1991 |
| EP | 652668 | 11/1994 |
| EP | 912036 | 4/1999 |

\* cited by examiner

*Primary Examiner*—Kim Huynh
*Assistant Examiner*—Alan S. Chen
(74) *Attorney, Agent, or Firm*—Fitzpatrick, Cella, Harper & Scinto

(57) ABSTRACT

This method of managing the resources of a computer communication means for processing a computer document stored on a processing control device connected by the communication means to at least one processing device includes a step of selecting at least one processing device of the communication means as a function of a first group of criteria relating to the functioning of this device, and a second group of criteria relating to its geographical situation.

57 Claims, 11 Drawing Sheets

METHOD AND DEVICE FOR MANAGING THE RESOURCES OF A COMPUTER COMMUNICATION MEANS FOR PROCESSING A COMPUTER DOCUMENT

BACKGROUND OF THE INVENTION

1. Field of the Invention

The present invention relates to a method and device for managing resources of a computer communication means for processing a computer document. More precisely, the present invention relates to a method for the selection and automatic configuration of a computer peripheral for processing a computer document.

2. Description of the Related Art

In a computer communication network, several computers and processing peripherals are generally connected.

The processing peripherals include both devices for printing a document, such as a printer or an electronic whiteboard associated with a printer and devices for transmitting a document, such as a facsimile machine, a modem, and, in general terms, any type of interface for communicating to the outside of the communication network in question.

These processing peripherals can also be document acquisition devices, such as a scanner, or possibly document storage devices.

Conventionally, these peripherals are connected to the network, either by being connected, via an interface card, to a computer itself connected to the network, or by being directly connected to the communication network. In the latter case, the use of the processing peripherals is in fact shared by all the users connected to the network by means of a computer.

More and more, these peripherals are being made accessible to the computer of a user by a wireless network. It is then no longer necessary to be connected to it by means of a cable in order, for example, to be able to print or transmit a document. These processings can possibly be implemented even when these peripherals have been moved since their last use by this user.

In general terms, for a user to be able to use a processing peripheral, such as a printer for example, situated in a precise geographical area, it is necessary for the user to know the geographical position of all the peripherals which are accessible to him via the communication network, cabled or otherwise. The user will first have to run through the network in order to obtain a list of the available peripherals, and then obtain, for each of them, its geographical position, and finally choose the peripherals which meet certain distance criteria, such, as, for example, the presence of this peripheral at a given place, its distance with respect to the office of the user or that of one of his colleagues, or the fact that the peripheral is outside the office of this same colleague.

In addition, and in order to obtain the best processing possible, the user will possibly have to modify the configuration of the driver giving access to this peripheral. For example, for a printer, he will be able to choose a high-resolution mode in order to correctly print the photographs contained in a given document.

In general terms, the peripherals generally have parameterisable operating modes whose parameters are fixed:
either at the time of the manufacture of the peripheral,
or, by default, by the central unit of the computer system,
or by a dialogue between the user and this computer system.

For example, in the particular case of a peripheral consisting of a printer, the configuration thereof notably takes into account the parameters concerning the type of ink or paper used, the required resolution or the print speed.

It is also preferable for this configuration to take account of the characteristics of the document to be processed, and notably its graphical content, when it is a case of the printing of a document.

If it is wished to take advantage of a peripheral, it is necessary to adjust a large number of parameters, and for each one to fix its appropriate value amongst all those possible offered by the peripheral.

All these operations are lengthy and not accessible to a conventional user of a communication network.

SUMMARY OF THE INVENTION

The purpose of the present invention is to remedy the aforementioned drawbacks, by proposing a method of managing resources allowing the selection and configuration of processing peripherals accessible from a computer in a wireless environment.

To this end, the present invention proposes a method of managing resources of a computer communication means for processing a computer document stored on a processing control device connected by the communications means to at least one processing device, remarkable in that it includes a step of selecting at least one processing device of the communication means as a function of a first group of criteria relating to the functioning of the device, and a second group of criteria relating to its geographical situation.

Thus the invention makes it possible to choose the processing device best suited, in terms of operating characteristics and location, to the processing of a document.

According to a particular characteristic, the method also includes, after the selection step, a step of choosing one processing device amongst those selected.

This characteristic contributes to the optimisation of the choice of the processing device best suited to the document.

According to a particular characteristic, the group of operating criteria includes parameters relating to the configuration capability of the processing device.

It is thus possible to choose the processing device according to its possibilities of being able to be configured one way or the other.

Preferably, the value of these parameters is determined according to the content of the document to be processed.

Thus, according to the content of the document to be processed, a processing device is chosen which is particularly well suited to processing the document, which can be configured according to the document to be processed.

According to a particular characteristic, the group of operating criteria includes characteristics chosen notably from amongst the processing device, the ability to process a colour file, the ability to process a file on both sides of the paper, the maximum resolution factor, the number of levels of grey or the number of colour shades.

These criteria make is possible to take into account the physical characteristics of the processing device and its ability to perform one or other processing.

According to a particular characteristic, the group of operating criteria includes a maximum number of documents awaiting processing, in order to avoid that the excessively long lists of documents to be processed be constituted by the same processing device, which would cause an excessively lengthy wait for obtaining the processing of a document.

According to a particular characteristic, the group of geographical situation criteria includes characteristics chosen notably from amongst the place where the processing device is situated, its proximity with respect to a given place, its distance with respect to a given place, or its distance with respect to the control device.

This characteristic makes it possible to choose, for example, the processing device closest to the user.

According to a particular characteristic, the communication means is a local wireless network, which makes it possible to profit from all the advantages of wireless networks.

In a particular embodiment, in order to determine the place where the device is situated, its proximity with respect to a given place, its distance with respect to a given place or its distance with respect to the control device, when there are insufficient base stations to do this, at least one hybrid station functioning in mobile station mode is switched to base station operating mode.

Thus the invention makes it possible to locate the processing device without adding any additional electronic component. This is because the invention makes it possible to re-use wireless communication adapters for effecting the location procedure; it is therefore unnecessary to add any specific electronic component in order to be able to implement the location function. This makes it possible to reduce the cost of the system.

In the preceding embodiment, according to a particular characteristic:
  a search operation is performed, consisting of seeking the presence of at least one base station in the environment of the processing device;
  if the presence of at least one base station is detected, for each base station detected, a measuring operation is performed, consisting of measuring the position of the processing device and determining the precision of the measurement made;

and, if the precision of the measurement made is less than a predetermined value:
  a change of mode request operation is performed, consisting of requesting a hybrid station operating in mobile station mode to switch into base station operating mode; and
  a switching operation is performed, consisting, for the hybrid station, of switching from mobile station operating mode to base station operating mode, in order to constitute a new base station.

Thus, the present invention proposes an adaptable procedure, making it possible to specify the precision with which the position measurement must be made.

According to a particular characteristic, the communication means is a local cabled network of the Ethernet type.

According to a particular characteristic, the method also includes, after the choosing step, a step of automatic configuration of the processing device.

This characteristic makes it possible to dispense with any manual intervention.

According to a particular characteristic, the configuration step is performed according to the content of the document to be processed.

According to a particular characteristic, the method also includes a step of analysing the content of the document to be processed before the configuration step.

The above two characteristics make it possible to determine the best configuration for each document.

According to a particular characteristic, the method also includes a step of translation of the document to be processed in the form of graphical instructions before the analysis step.

According to a particular characteristic, the analysis step is performed from the graphical instructions.

According to a particular characteristic, the method also includes a step of choosing a correct configuration of the processing device.

According to a particular characteristic, the choosing step is performed from the results of the analysis of the document to be processed.

According to a particular characteristic, the method also includes a step of obtaining supplementary data before the step of choosing a correct configuration.

It is thus possible to modify the configuration of the driver of a processing device, not only from the content of the document to be processed, but also according to certain other parameters which depend on the operating conditions of the processing device but also on the requirement of the user.

According to a particular characteristic, the obtaining step is performed by reading operating parameters of the processing device amongst at least one type of printing ink used and one type of paper.

It is thus possible to pre-record a certain number of parameters which are not modified over time, or only very occasionally.

This particular characteristic makes it possible to avoid the user having to reference these parameters at each new processing.

In a variant, the obtaining step is performed by interrogating a user on operating parameters of the processing device from amongst at least one draft operating mode, one type of printing ink and one type of paper.

This variant allows greater flexibility of operation of the processing device.

According to a particular characteristic, the content of the computer document is grouped by page.

This characteristic makes it possible to divide the document to be processed into processing units, for which a different configuration can possibly be applied to the processing device according to the content of each page of the document to be processed.

In a particularly practical manner, when it is a case of representing a document, on a screen, or by printing on a paper medium, the analysis step includes steps according to which:
  it is sought whether or not open graphical functions exist;
  it is sought whether or not closed graphical functions exist;
  it is sought whether or not representations in bitmap mode exist;
  it is sought whether or not text functions exist.

According to a particular characteristic, the configuration choosing step is adapted to choose the correct configuration from amongst a set of pre-recorded configurations for the processing device and dependent on the content of the document.

Thus, the configuration is effected in a relatively simple manner, by applying an example of a pre-recorded configuration which is particularly well suited to the content of the document.

This correct configuration can thus be pre-recorded from data supplied from the manufacturer of the processing device, who knows sufficiently well the possibilities offered by the processing device for adapting the configuration thereof to the content of the document to be processed.

In a variant, the configuration choosing step is adapted to choose the correct configuration amongst a set of pre-recorded configurations for the processing device and dependent upon the content of the document and additional data obtained at the obtaining step.

In practice, when the processing device makes it possible to represent a document on a screen or on a paper medium, the set of pre-recorded configurations includes at least one configuration for a draft operating mode, one configuration for the processing of images, one configuration for the processing of graphics and one configuration for the processing of a text.

The processing of the document is thus adapted to its graphical content.

In a variant, the set of pre-recorded configurations includes several sub-sets containing one configuration for a draft operating mode, one configuration for the processing of images, one configuration for the processing of graphics, and one configuration for the processing of a text, each sub-set being defined for a unique combination of type of printing ink and paper used.

There is thus available, for a given processing device, a very large number of possible configurations, dependent on the number of possible combinations between the type of ink and the type of paper used.

In a first practical embodiment of the invention, the process includes a printing of the computer document, the processing device being a printer.

In a second practical embodiment of the invention, the processing includes a transfer of the computer document over a telecommunication network, the processing device being a modem or facsimile machine.

For the same purpose as indicated above, the present invention also proposes a device for managing the resources of a computer communication means for processing a computer document stored on a processing control device connected by the communication means to at least one processing device, remarkable in that it includes a module for selecting at least one processing device of the communication means as a function of a first group of criteria relating to the functioning of the device, and a second group of criteria relating to its geographical situation.

The invention also relates to a mobile station in a wireless telecommunication network, having means adapted to implement a management method as above.

The invention also relates to a mobile station in a wireless telecommunication network, having a management device as above.

The invention also relates to a base station in a wireless telecommunication network, having means adapted to implement a management method as above.

The invention also relates to a base station in a wireless telecommunication network, having a management device as above.

The invention also relates to a wireless telecommunication network, having means adapted to implement a management method as above.

The invention also relates to a wireless telecommunication network, having a management device as above.

The invention also relates to:
an information storage means which can be read by a computer or microprocessor storing instructions of a computer program, making it possible to implement a management method as above, and an information storage means which is removable, partially or totally, and which can be read by a computer or microprocessor storing instructions of a computer program, making it possible to implement a management method as above.

The invention also relates to a computer program containing sequences of instructions for implementing a management method as above.

The particular characteristics and the advantages of the management device, of the mobile stations, of the base stations, of the telecommunications networks, of the information storage means and of the computer program being the same as those of the management method according to the invention, they are not repeated here.

Other particular characteristics and advantages of the invention will emerge from a reading from the following detailed description of particular embodiments, given by way of in no way limitative examples. The description refers to the drawings which accompany it.

DETAILED DESCRIPTION OF THE PREFERRED EMBODIMENTS

Figure 1:
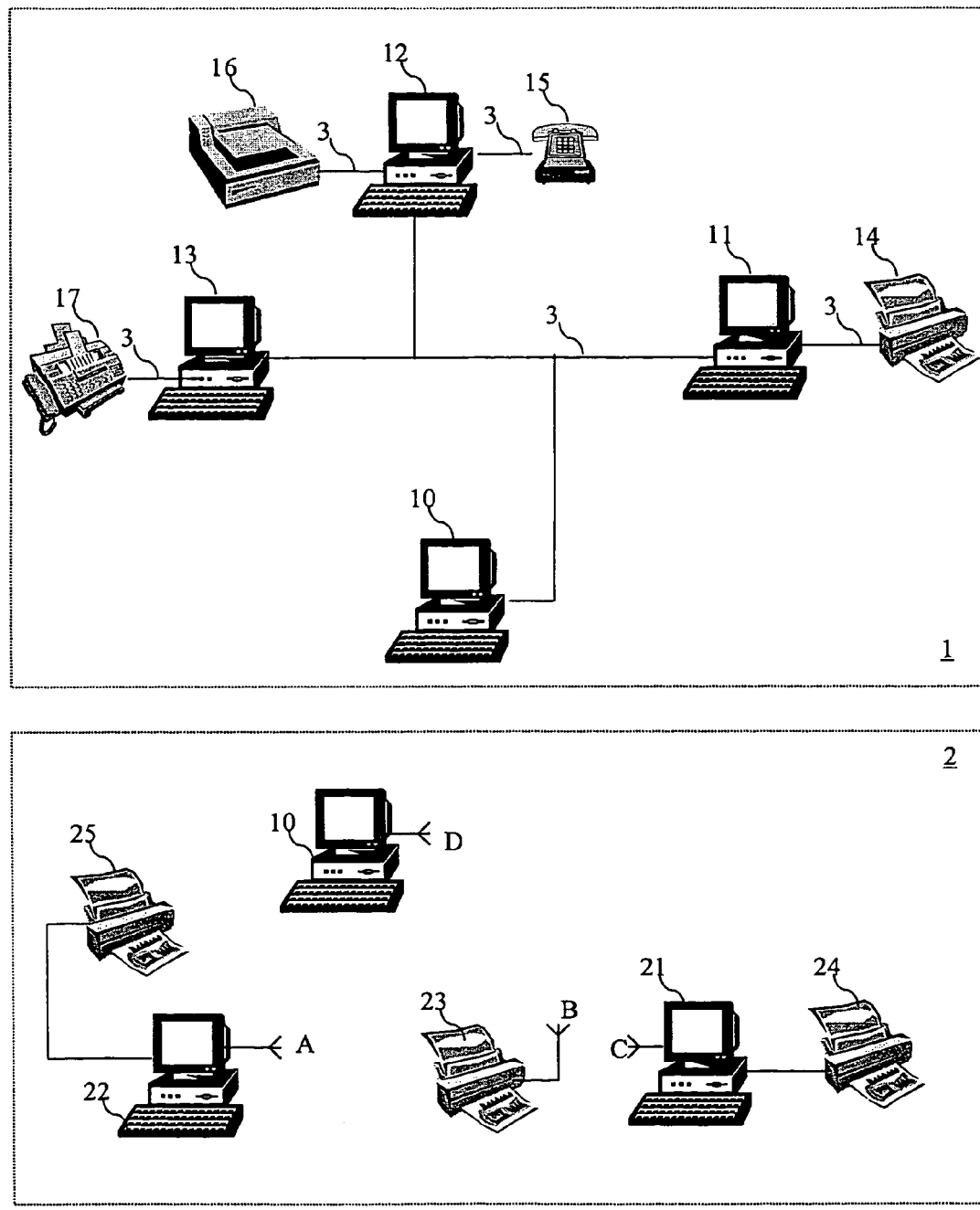
FIG. 1 depicts schematically a cabled communication network and a wireless communication network adapted to implement the invention.

A description is first of all given, with the help of FIG. 1, of communications networks 1 and 2 adapted to implement the invention.

A first network 1 includes several computers 11, 12 and 13 connected together by a cabled network 3 of a particular type. The cabled network 3 is for example an Ethernet network.

Processing peripherals of different types can be connected to these computers in order to implement different types of processing of a file. For example, a printer 14 is connected to a first computer 11, a modem 15 and a scanner 16 are connected to a second computer 12 and a facsimile machine 17 is connected to a third computer 13.

These processing peripherals 14, 15, 16 and 17 are connected to the computers by specific connections of appropriate types usual in cabled computer networks, such as for example, serial, parallel or SCSI ("*Small Computer System Interface*") links.

Naturally, in this type of cabled communication network, processing peripherals could also be directly connected to the communication network 3, without a computer being interposed.

A second network 2 is also adapted to implement the invention. It is a case here of a wireless communication network, the computers and peripherals of the network 2 communicating with each other by radio links.

This second network thus has in this example two computers 21, 22 and a printer 23, each having a communication port A, B, C consisting of an antenna adapted to receive and transmit radio waves.

In addition, the computers 21 and 22 are connected as before, by connections which are usual in cabled networks, respectively to printers 24 and 25.

Throughout the remainder, by way of non-limitative example, it is considered that the processing peripherals are printers adapted to print a document.

Naturally, the processing peripherals can be document printing devices, such as a printer 14, 23, 24, 25 or an electronic whiteboard, or document transmission devices such as a facsimile machine 17 or a modem 15, or document acquisition devices, such as a scanner 16.

A mobile computer 10 can be connected to the first network 1 so that a document stored on this mobile computer 10 can be processed by one of the processing peripherals 14, 15, 16 or 17 in the network 1.

This mobile computer can be moved, when the user for example changes place, and be connected to the second network 2 by means of a radio antenna D.

According to its location in this wireless communication network 2, this mobile computer 10 will be anchored in the network 2 by means of one of the communication ports A, B, C.

If necessary, the mobile computer 10 can be moved within the wireless network 2 so that its anchoring point is modified.

Likewise, the mobile printers 23, 24 and 25 can be moved within the wireless communication network 2, so that their geographical position is modified, without all the users being informed of this.

The users of the communication network 2 will preferably use one or other processing peripheral according to their current geographical position.

A description will now be given of the structure of a selection and configuration device which can be incorporated in one or more of the computers 10 to 13 in the networks 1 to 2 described above.

The selection and configuration device has:

a selection sub-module allowing the choice of a file processing device in the communication network according to the geographical location of the processing device; and a configuration sub-module, for configuring this processing device according to the content of the document to be printed.

Figure 4:
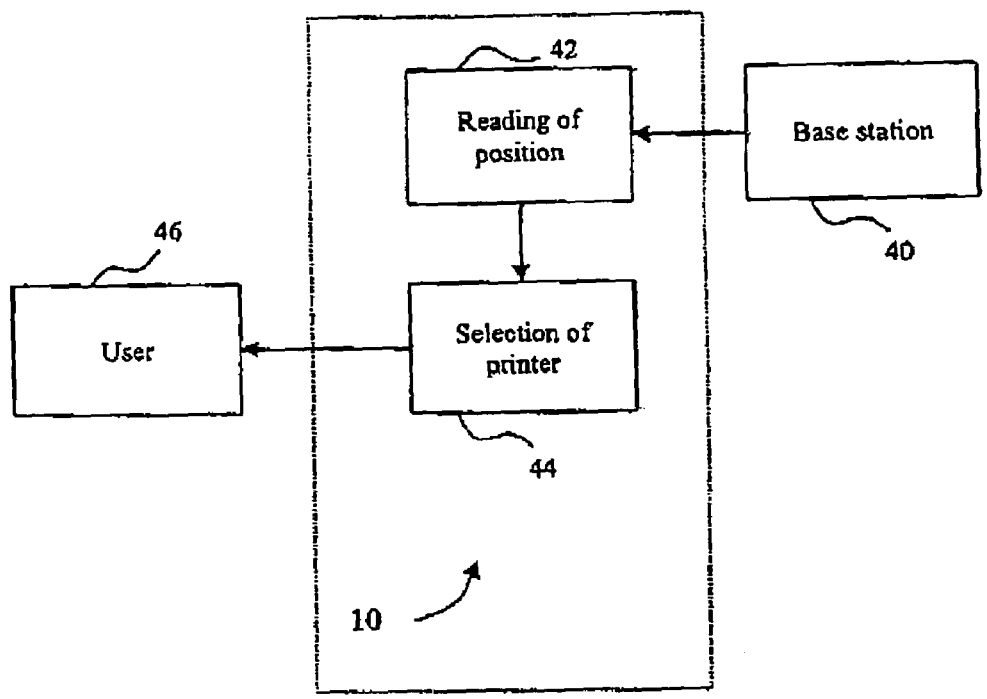
FIG. 4 depicts schematically the different entities taking part in the selection and configuration procedure according to the present invention applied to a computer, in a particular embodiment.

The selection sub-device will first of all be described. This description will be given for a computer 10 with reference to FIG. 4. The other peripherals 11 to 13 naturally have a similar structure.

As is known, in wireless networks, the measurement of a radio signal received by a mobile makes it possible to know its distance from the source of the signal.

Thus a mobile can execute, either on demand or autonomously, a location procedure enabling it to know its position in space with respect to a relative reference frame. Once known, the position is transmitted by the mobile to its base station 40.

In practice, the base station is chosen as the centre of the relative reference frame.

In accordance with the invention, the location procedure is executed regularly by all the mobiles in the same cell. The associated base station therefore knows at any time, simply by reading (block 42 in FIG. 4), the relative position of the mobiles situated therein.

This embodiment enables a mobile computer 10 wishing to print a document to choose a printer (block 44 in FIG. 4) which is at a reasonable distance from itself, and therefore avoiding a user 46 going an excessively great distance to go and recover printed documents.

In addition, the additional knowledge by at least one peripheral of its exact geographical position (latitude, longitude) makes it possible to transform the relative reference frame into an absolute reference frame, and therefore to know the exact geographical position of all the mobiles in a cell. For example, this information can be supplied by a GPS ("Global Positioning System") connected to one of the mobiles.

According to a preferred embodiment of the invention, such a GPS module is connected to the base station.

This embodiment makes it possible to choose a printer, no longer according to its relative distance with respect to a computer wishing to print, but according to its exact geographical situation, for example close to the office of one colleague or another, or on the contrary far from the office of a particular colleague.

According to another preferred embodiment of the invention, and possibly as a complement to the first embodiment above, the geographical position of the base station is supplied to the base station by the administrator of the communication network.

In accordance with the invention, where the communication network comprises several base stations, connected together by this same network or by another network, the mobile computer 10 wishing to print successively interrogates each of these stations in order to select the printer best meeting the geographical location constraints supplied by the user.

In addition, the printer can be selected according to another group of criteria, relating not to the geographical situation of the printer but to its functioning. This group of criteria can thus include characteristics depending on the physical characteristics of the printer. These include, by way of non-limitative examples:

the type of printer (inkjet or laser printer);

its capability of processing a colour file and the number of colours available;

the number of levels of grey available;

its capability of printing a file on both sides of the paper; or its maximum resolution factor expressed as dots per inch.

This group of criteria can also include a maximum number of files awaiting printing by the printer, in order to avoid choosing a printer which already has a large number of jobs waiting.

For this purpose, it is possible to compare the time elapsed since the printing was begun to be used by the user with a maximum pre-determined printer search time.

In practical terms, for each printer in the network, the following function is calculated:

$$Q = \frac{\sum_{i=1}^{N} w_i \times p_i}{N}$$

where $p_i$ corresponds to the criterion i in a group of N criteria and $w_i$, corresponds to the desirability of the criterion i.

Thus $p_i$ is equal to 1 if the criterion i is satisfied by the printer and 0 otherwise.

The optional weights $w_i$ are associated by the user with the criteria so that, for example, $w_i$ is equal to 2 if the criterion i must necessarily by satisfied by the printer, 1 if it is preferable for this criterion i to be satisfied and 0.25 if it is of lesser importance.

For each printer the function Q is calculated and the printer for which the function Q is the highest is selected.

The group of operating criteria can also include parameters relating to the configuration capability of the printer.

The value of these parameters is determined according to the content of the file to be processed.

It is thus possible, from the analysis of the file itself or a temporary file containing graphical instructions, such as an EMF (Enhanced MetaFile) file in Windows (registered trademark), to determine the configuration best suited to print the file amongst the configurations in text mode, graphical mode or image mode.

The user can also choose printing in draft mode.

The selection process implemented by the selection sub-module will now be described with reference to FIGS. 9 and 10.

Figure 9:
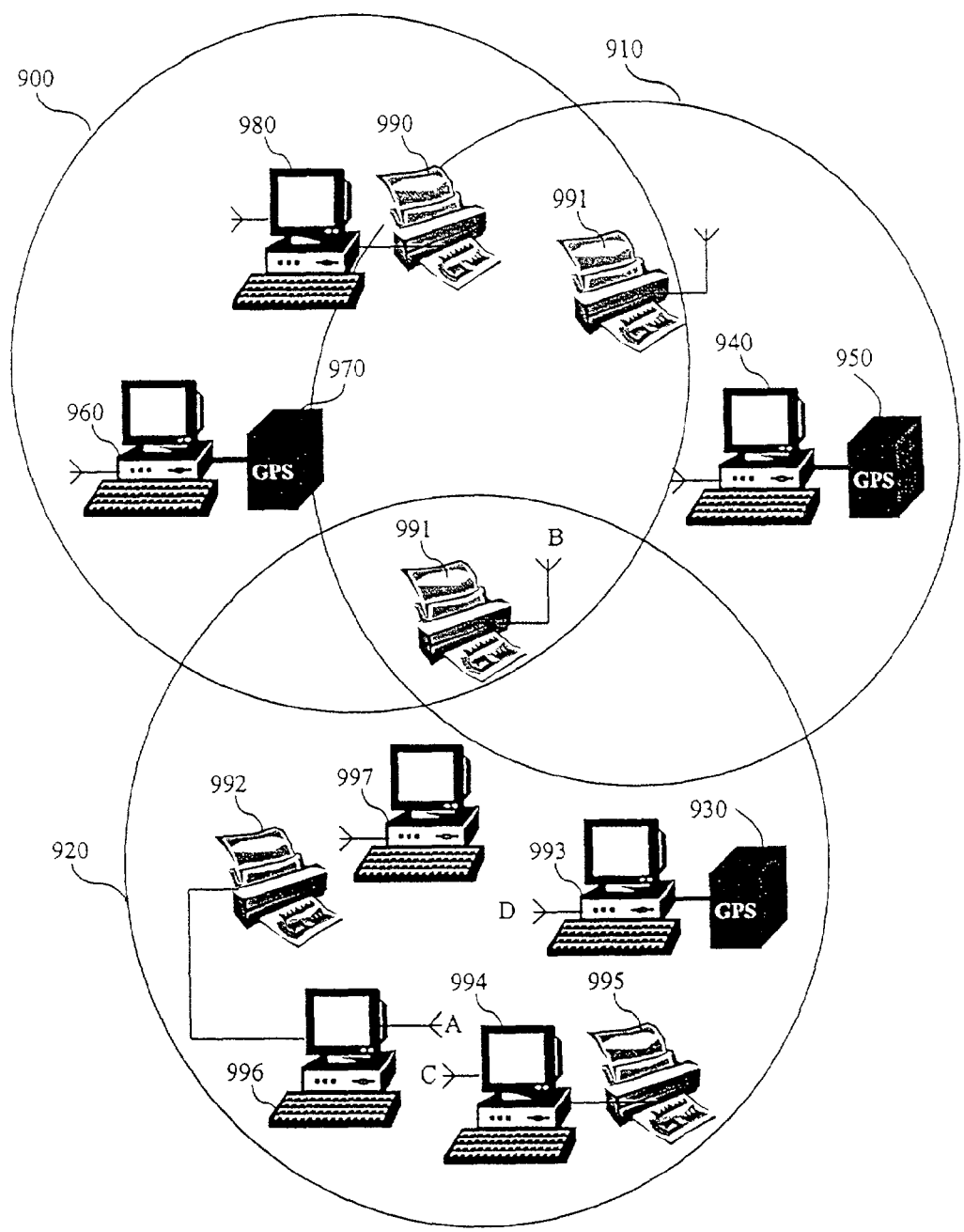
FIG. 9 depicts schematically a wireless communication network in the form of different cells.

FIG. 9 illustrates a wireless network in the form of its division into cells. Such a division is well-known to a person skilled in the art.

Here the wireless network is divided into three cells, 900, 910 and 920, whose intersections may not be empty.

Each of these cells contains a DECT ("Digital Enhanced Cordless Telecommunications") base station: the station 960 for the cell 900, the station 940 for the cell 910 and the station 993 for the cell 920.

A GPS module is associated with each of these base stations: a module b for the base station 960, a module 950 for the base station 940 and a module 930 for the base station 993.

In the remainder of the description the positioning of a computer peripheral will be studied, based on the cell 920.

Figure 10:
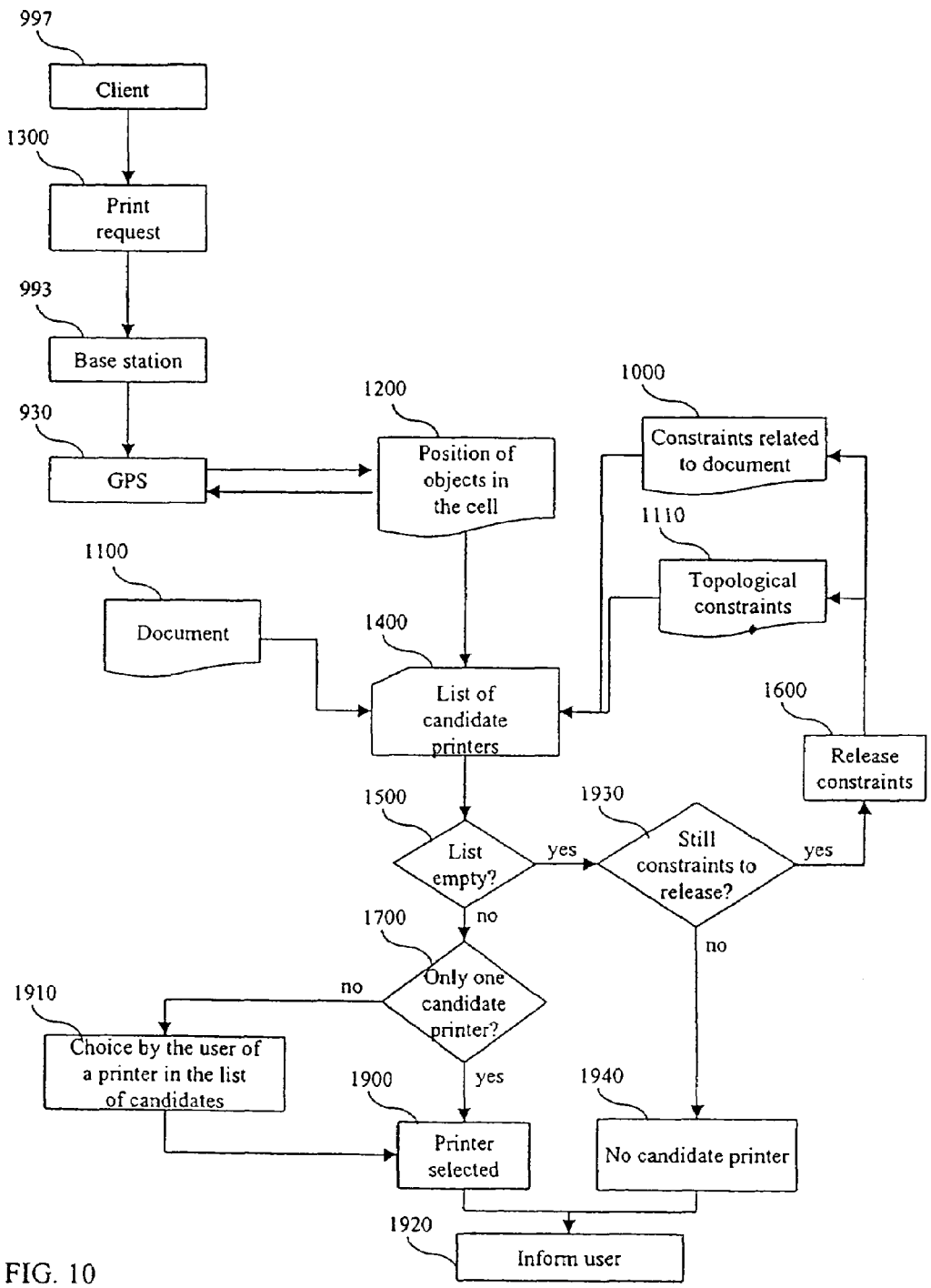
FIG. 10 is a flow diagram illustrating the successive steps of a selection method according to the present invention, performed during the selection of a printer.

FIG. 10 illustrates the steps of the method of selecting a printer by interrogating the DECT base station of the local cell.

A personal computer 997, also referred to as the client, sends a print request 1300 to the system in order for the latter to print on a printer satisfying a certain number of constraints:

constraints 1000 relating to the document to be printed 1100, and constraints related to the topological data 1200 of the cell, which describe the relative positions of each object in the network, as well as their absolute position with respect to the base station 993 provided with a GPS module 930. The data 1200 also supply information on the positions of the objects in the network with respect to a certain number of reference points for the place where this network is deployed, such as the offices, dedicated rooms, exits etc, which implies the possible use of topological constraints 1110 of the type "alongside office A", "close to the exit", "not in X's office", etc.

The base station 993 illustrated in FIG. 9, by means of the GPS module 930, maintains the topological information 1200.

According to this information 1200, constraints related to the document 1000 and the document 1100 itself, a list of 1400 of printers which are candidates for the printing if performed.

If the list 1400 is empty (test 1500), the user is requested to release some of the constraints relating to the document or topological constraints (step 1600).

If there are no more constraints to be released (test 1930 negative), then it is concluded from this (step 1940) that there are no candidate printers for the print request 1300.

Otherwise, if the list of printers 1400 is not empty (test 1500 negative), but contains only one candidate printer (test 1700 positive), the user is informed (step 1920) that the printing is beginning on this printer (step 1900).

Finally, if the list 1400 contains more than one printer (test 1700 negative), the choice of one printer amongst the candidate printers (step 1910) is left to the user. At step 1900, this printer is then used for initiating the printing and the user is informed of this at step 1920.

A description will now be given of the automatic configuration part of the device.

Figure 5:
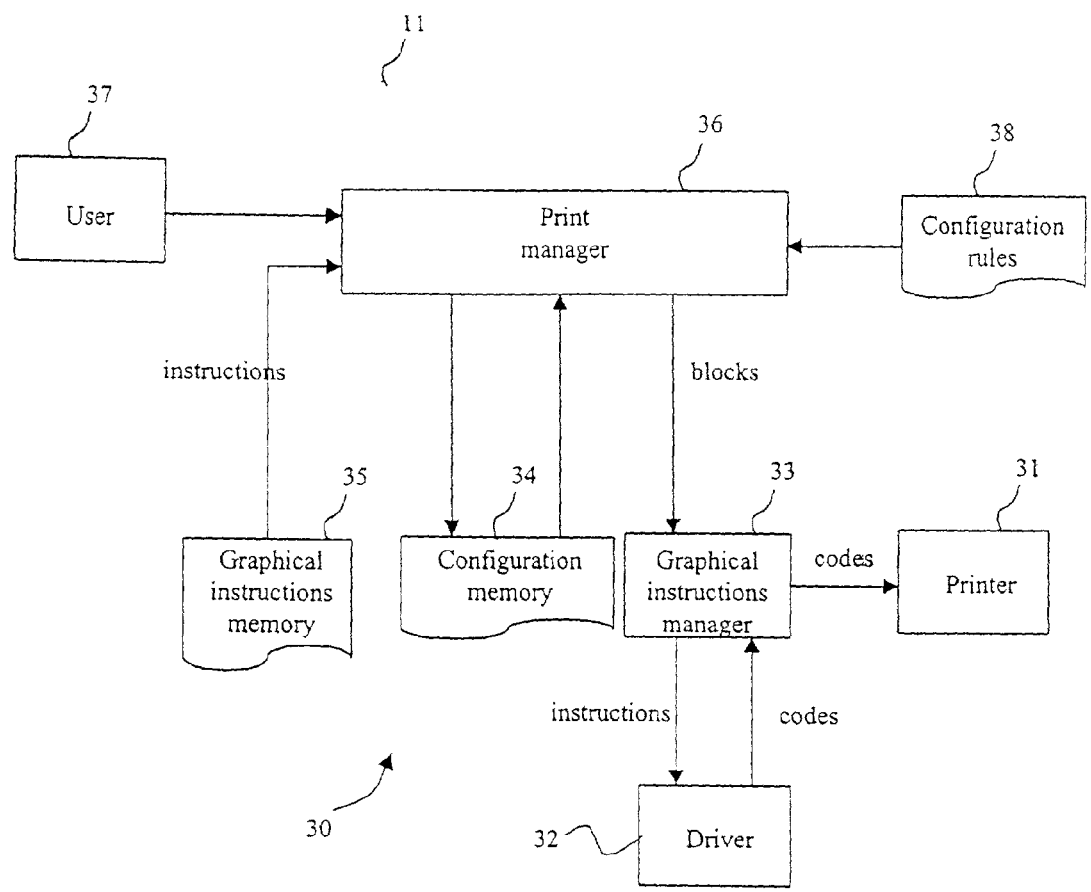
FIG. 5 depicts schematically the structure of a module for the automatic configuration of a peripheral according to the present invention, in a particular embodiment.

The automatic configuration sub-module 30, as illustrated in FIG. 5, makes it possible to configure a computer peripheral for processing a computer document.

In the remainder of the description, it is considered, by way of non-limitative example, that the peripheral in question is a printer 31.

However, the peripheral in question could just as well be a modem or facsimile machine, the processing of a document including in this case the transfer of this document over a telephone communication network.

As is known, a printer 31 is controlled by a driver 32, which is a software module in a computer system having a processor, such as a computer. This module is dedicated to communication with another system having its operating software for performing a set of elementary operations.

The driver 32 thus translates a complex operation required by a high-level software application into a set of elementary operations which can be executed by the printer. The driver thus effects a translation of a set of instructions, for example graphical instructions sent by a graphical instruction manager 33, into a set of codes which can be read by the printer 31.

The configuration of a driver 32 amounts to fixing the value of each parameter of this translation. These parameters concern for example the translation of the character fonts of a text into a series of dots able to be formed by the printer 31, or the translation of the colour palette of a document into a colour palette of the printer 31.

This configuration of the driver 32 is thus stored in a storage module 34 for configuring the printer 31.

The selection and configuration device also includes a temporary storage module 35 for the instructions, here graphical instructions.

These instructions are of the type "draw a line", "draw an ellipse", "draw a representation in bitmap mode", for example.

This temporary storage module 35 is adapted to store instructions grouped together by page of the computer document to be printed.

For example, in a computer system managed under "Windows", the graphical instructions sent by an application are received by a graphical instruction manager (referred to as GDI in "Windows") and stored in EMF files, each file corresponding to a document page.

An SPL file ("Spool File") is also created for listing all the references of the existing EMF files for the document and also storing the configuration of the driver 32 as parameterised at the time when the application starts the printing of the document.

Thus, in "Windows", the storage module for the configuration 34 is incorporated in the SPL file.

Conventionally, a printing manager 36 ("Print Processor" in "Windows") recovers the graphical instructions stored in the EMF files and sends them by blocks to the graphical instructions manager 33 which in its turn transmits them to the driver 32.

The latter translates these instructions in the form of codes, using the configuration as stored in the SPL file.

The codes are returned to the graphical instructions manager 33 and then sent to the printer 31, which can thus effect the printing proper of the document.

Naturally, in a printing system in which there is no temporary storage of graphical instructions in EMF files, the configuration sub-module in accordance with the invention has specific means of storing the graphical instructions which come from the application.

In accordance with the invention, the selection and configuration device also has a module for analysing the content of the computer document from these stored instructions.

This analysis module is preferably incorporated in the printing manager 36 ("Print Processor" in "Windows").

When the instructions stored are graphical instructions, the analysis module is adapted to seek the existence or not of open graphical functions, closed graphical functions, bitmap mode representations and text functions.

The selection and configuration device also has, in the printing manager 36, a module for obtaining supplementary data, adapted to supply supplementary data to the selection sub-module for choosing a correct configuration.

For a printer, for example, this obtaining module is adapted to read operating parameters of the printer independent of the document, such as the type of printing ink used and the type of paper loaded in the printer.

These additional data can be stored in a specific memory space by the user 37 when they do not vary over time.

Naturally, the obtaining module can be adapted to interrogate a user 37 on these operating parameters of the printer, each time a printing of a document is initialised.

In this case, the supplementary data can also comprise information on the choice or not of a draft operating mode for the printer, which enables the user 37 to rapidly obtain the printing of a document.

The selection and configuration device also has, in the printing manager 36, a module for choosing a correct configuration of the printer according to the content of the document.

This choosing module co-operates with a set of pre-recorded configurations 38 for this printer 31, depending on the content of the document and preferably also on the supplementary data obtained by the aforementioned obtaining module.

Thus, in a practical fashion for printing a document, this set of pre-recorded configurations 38 includes a configuration for a draft operating mode, a configuration for the processing of images, a configuration for the processing of graphics and a configuration for the processing of a text, this number of configurations being multiplied by the number of possible combinations of type of printing ink and type of paper used.

The selection and configuration device also has an entry module for entering the chosen configuration in the configuration storage module 34 associated with the driver 32.

This entry module is also incorporated in the printing manager 36 and makes it possible to replace the configuration stored in the SPL file in Windows with the chosen configuration particularly well suited to the printing of the document.

The automatic configuration method implemented by the selection and configuration device will now be described with the help of FIGS. 6 to 8.

When the user initialises the printing of a document by a printer, for example a local printer for the computer on which the document is stored, the graphical instructions are sent by the application to the driver 32 of the printer 31, by means of the graphical instructions manager 33, with a view to the translation of these instructions by the driver 32.

Figure 6:
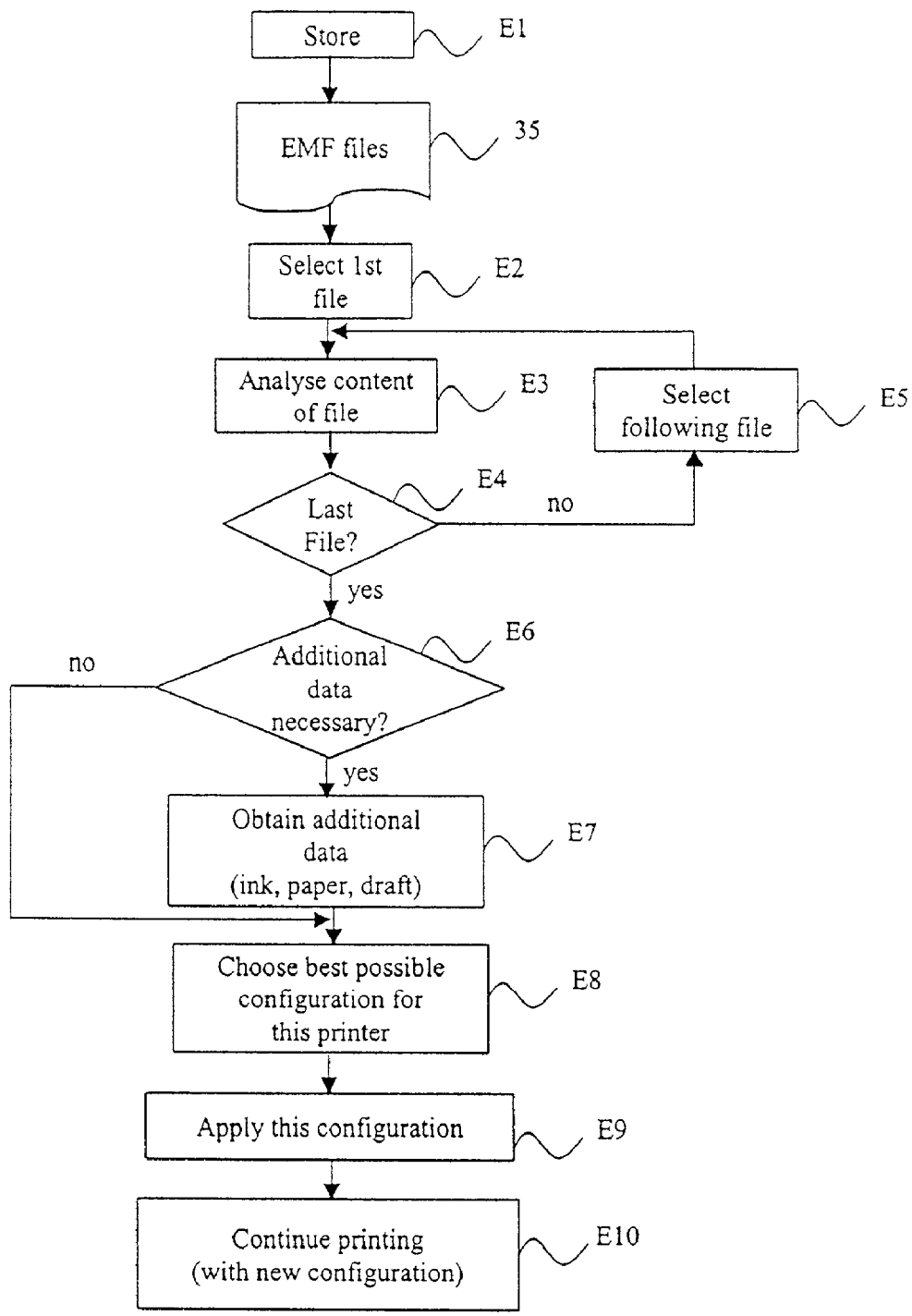
FIGS. 6 to 8 are flow diagrams illustrating the successive steps performed during application of an automatic configuration method according to the present invention, in a particular embodiment.

As shown in FIG. 6, before this step, the configuration method according to the invention includes a step of temporary storage El of the graphical instructions.

In Windows, this step is implemented by storing the graphical instructions in EMF files, in the temporary graphical instructions storage module 35. These files thus form a buffer which releases the application throughout the printing and notably whilst the driver is processing the graphical instructions sent to it.

The graphical instructions are thus grouped by page of the computer document.

An analysis of the content of the computer document is then implemented from the graphical instructions stored in the EMF files.

During a selection step E2, a first file is selected, its content is analysed during step E3 and then it is checked, during a test E4, whether it is the last file.

In the negative, the following file is selected in a selection step E5 and the previous steps E3 and E4 are re-iterated.

Figure 7:
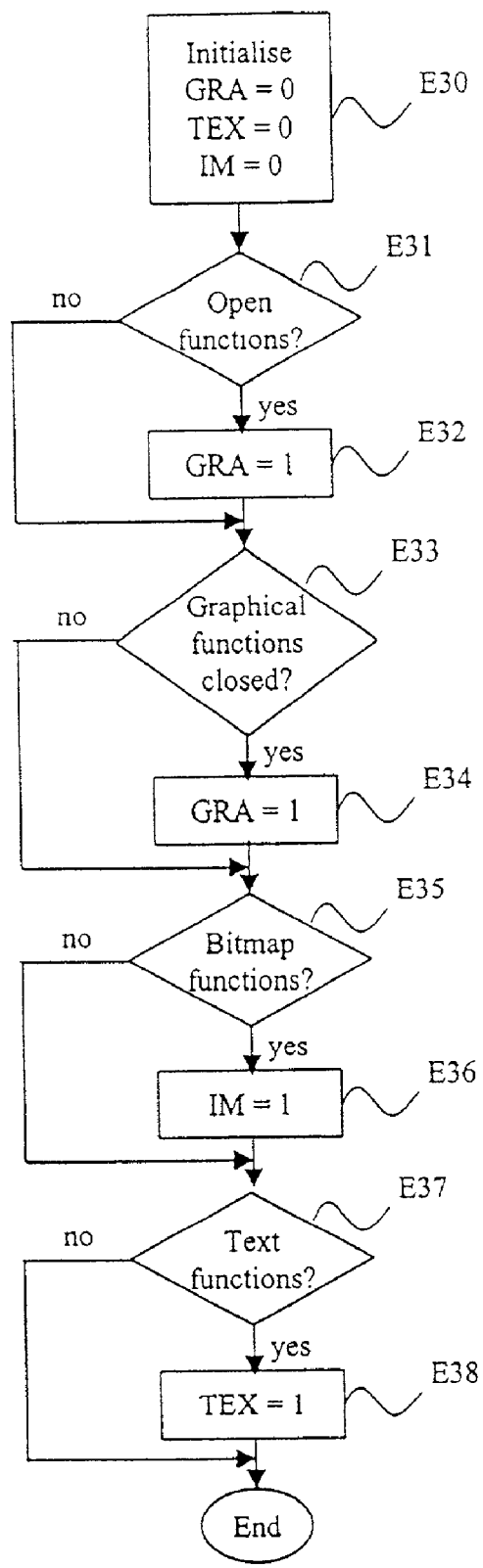

As illustrated in detail in FIG. 7, the analysis step E3 proper comprises an initialisation step E30, during which indicators GRA, IM and TEX are initialised to an initial value, for example 0.

It is first of all checked, during step E31, whether open graphical functions, that is to say ones of the type containing a curve, a straight line, an arc, etc, exist in the selected EMF file.

In the affirmative, during a step E32, the value of the indicator GRA is modified by associating with it for example the value 1.

Whatever the response, it is next checked during a step E33 whether closed graphical functions, that is to say of the type containing a circle, a rectangle, a polygon, etc, exist in the selected EMF file.

In the affirmative, during a step E34, the value of the indicator GRA is modified by associating with it for example the value 1.

Whatever the response, it is next checked, during a step E35, whether representations in bitmap mode exist in the selected EMF file, that is to say whether there is an image.

In the affirmative, during a step E36, the value of the indicator IM is modified by associating with it for example the value 1.

Whatever the response, it is finally checked during a step E37 whether there is text in the selected EMF file.

In the affirmative, during a step E38, the value of the indicator TEX is modified by associating with it for example the value 1.

The content of each EMF file selected if thus analysed automatically in order to know the graphical functions which must be drawn by the printer.

Next, as shown by FIG. 6, a test E6 checks whether supplementary data are necessary for choosing the configuration. Such is the case for example when the pre-recorded configurations are dependent upon the type of paper and the type of printing ink used.

If supplementary data are necessary, these supplementary data are obtained during a step E7, either by reading in a specific memory the type of printing ink used and the type of paper placed in the printer, or by interrogating the user on this type of ink and paper and on the possible choice of a print mode in draft quality which makes it possible to obtain printing of the document of less good quality, but more rapid.

The automatic configuration method according to the invention next includes a choosing step E8 consisting of choosing a correct configuration of the printer 31 according to the content of the document.

In this example the correct configuration is chosen amongst a set of configurations pre-recorded for this printer 31 and dependent on the content of the document and any supplementary data obtained at the obtaining step E7.

Thus the set of pre-recorded configurations includes, for each combination of ink and paper, at least one configuration for a draft operating mode, one configuration for the processing of images, one configuration for the processing of graphics and one configuration for the processing of a text.

Figure 8:
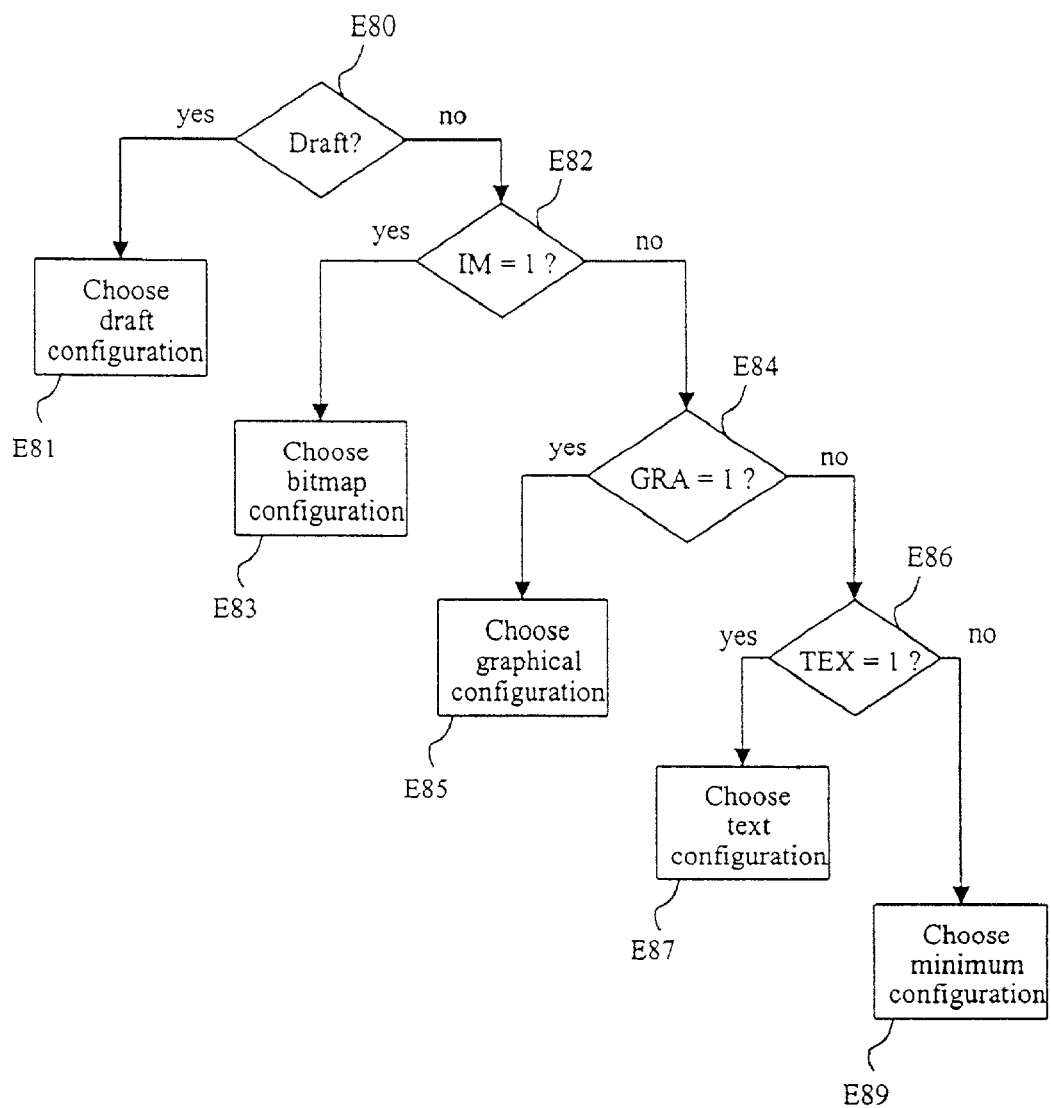

As illustrated in FIG. 8, the choice of this configuration is made according to the following hierarchy, for a fixed combination of ink and paper.

During a test E80, it is checked first of all whether the draft print mode has been requested by the user.

In the affirmative, the draft configuration is chosen during a step E81, which makes it possible to obtain a printing of average quality, generally in black and white.

If not, the choosing process continues and, during a test E82, it is checked whether the indicator IM is equal to 1, that is to say whether the document comprises images.

In the affirmative, during step E83, a configuration is chosen for the image processing, or a bitmap configuration. This configuration generally offers high resolution printing in colour, which makes it possible to obtain a correct reproduction of the images.

If not, the choosing process continues and, during a test 84, it is checked whether the indicator GRA is equal to 1, that is to say whether the document includes drawings.

In the affirmative, during step E85, a configuration is chosen for the processing of graphics, having a resolution less than that used for the processing of images.

If not, the choosing process continues and, during a test E86, it is checked whether the indicator TEX is equal to 1, that is to say whether the document includes text.

In the affirmative, during a step E87, a configuration well suited to the printing of a text is chosen.

If not, if none of the indicators GRA, IM, TEX has the value 1, during a step E89, a minimum configuration is chosen, which may be the draft configuration or another pre-defined configuration.

Such may be the case if the document is empty or if it includes graphical instructions without any real application, such as for example "print the characters in blue" whilst the document contains no character to which this change of colour applies.

In a practical manner, the configuration chosen is in the form of a set of values to be applied to different configuration parameters of the driver 32.

As shown by FIG. 6, during a step E9, this chosen configuration is applied by entering it in the configuration storage module 34 associated with the driver 32, that is to say, in Windows, in the SPL file.

In practice, this entry of a new configuration is equivalent to changing the value of the different parameters on which the functioning of the printer 31 and the generation of the codes by the driver 32 depend.

A conventional step E10 for continuing the printing is then implemented, after the aforementioned steps of temporary storage E1, analysis E3, choosing E8 and entering E9.

Thus, the graphical instructions are sent in blocks from the EMF files to the graphical instructions manager 33 by the printing manager 36.

The graphical instructions manager 33 then sends these instructions to the driver 32, who can translate them into codes which can be read by the printer 31 using the new configuration previously recorded in the memory 34.

Thus it is possible, by judiciously intercepting the graphical instructions before they are translated by the printer driver, to configure the latter according to the content of the document.

The content of this document is also easily accessible by virtue of the direct analysis of the graphical instructions generated by the application at the time of printing.

On a given computer, a set of pre-recorded configurations can be stored for each printer accessible through this computer, either locally or through the communication network.

Figure 2:
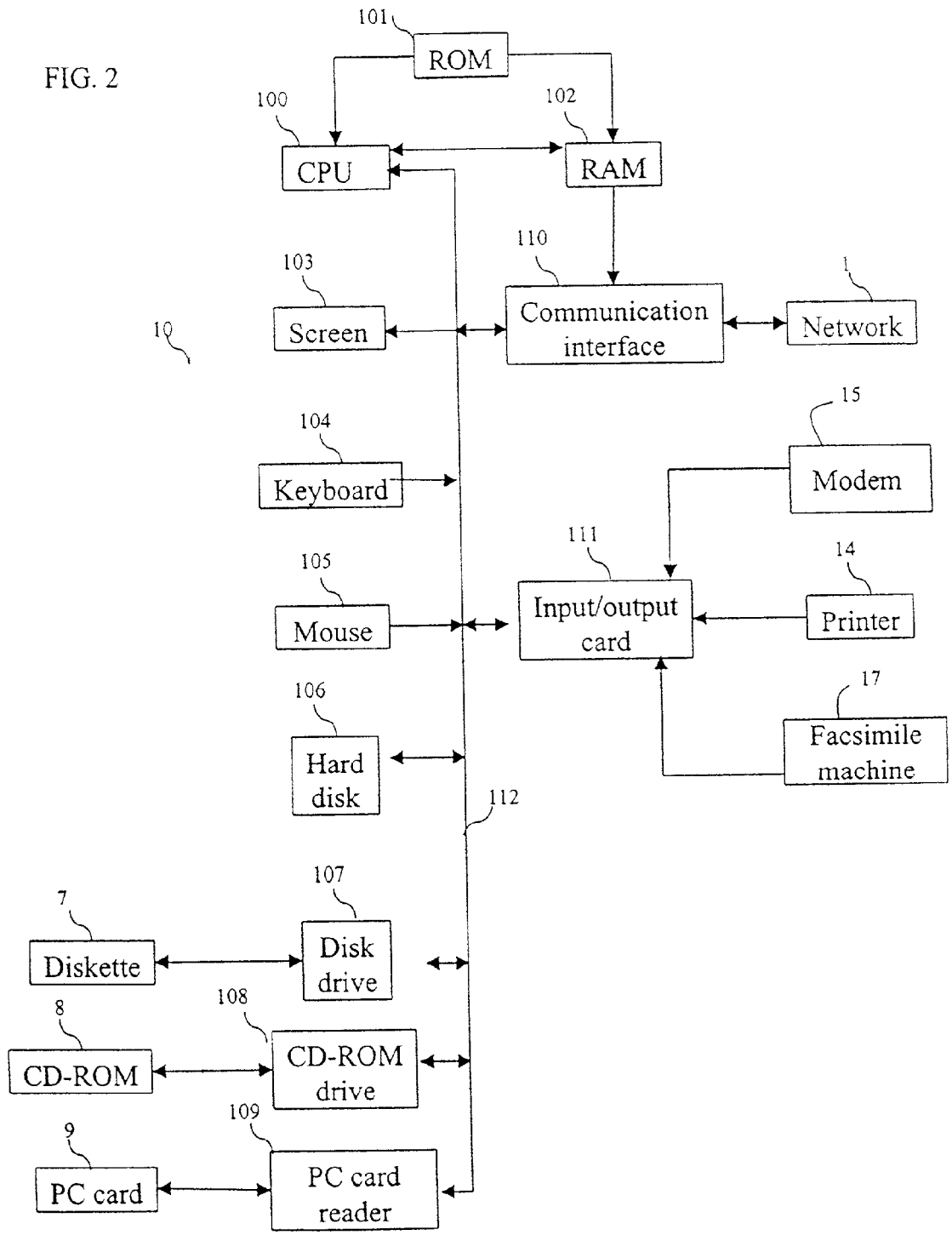
FIG. 2 depicts schematically an electronic device incorporating a selection and configuration device according to the invention, in a particular embodiment.

The set of aforementioned means of the selection and configuration device can be inserted in a computer 10 as illustrated in FIG. 2, incorporating a microprocessor or central unit 100 (CPU).

A read only memory 101 is adapted to store a program for updating a list of processing peripherals accessible from the mobile computer 10, in order to update configuration characteristics of the processing peripherals accessible and to process a document according to the available bandwidth.

A random access memory 102 comprises registers adapted to store variables modified during the execution of this program.

The microprocessor 100 is integrated into the computer 10, which can be connected to different processing peripherals, such as, for example, a modem 15, a printer 14 or a facsimile machine 17, either directly by means of an input/output card 111, or by means of the communication network 1.

This computer 10 has a communication interface 110 which can be connected to the communication network 1 in order to receive or transmit computer requests and transfer or receive documents.

The computer 10 also has document storage means such as a hard disk 106, or is adapted to co-operate, by means of a disk drive 107, a compact disc drive 108 or a computer card reader 109, with removable document storage means, respectively diskettes 7, compact discs 8 (CDs) or PC cards 9.

These fixed or removable storage means can also contain the code of the method according to the invention which, once read by the microprocessor 100, can be stored on the hard disk 106.

As a variant, the program enabling the device to implement the invention can be stored in the read only memory 101 (ROM).

In another variant, the program can be received in order to be stored as described previously by means of the communication network 1.

The computer 10 also has a screen 103 for serving for example as an interface with an operator by means of a keyboard 104 or mouse 105 or any other means. This screen 103 constitutes the display means which make it possible to display, for example, the printer chosen by the management device.

The central unit 100 executes the instructions relating to the implementation of the invention. On powering up, the programs and methods relating to the invention stored in a non-volatile memory, for example the read only memory 101, are transferred into the random access memory 102 (RAM), which will then contain the executable code of the invention as well as the variables necessary for implementing the invention.

Thus the read only memory 101 will store notably all the pre-recorded configurations 38 and the code of the program to be executed in order automatically to configure the driver according to the content of the document.

The random access memory 102 comprises registers for the temporary storage of the graphical instructions and for storing the configuration of the driver 32.

A communication bus 112 affords communication between the different sub-elements of the computer 10 or connected to it. The representation of the bus 112 is not limitative: in particular the microprocessor 100 is able to communicate instructions to any sub-element directly or by means of another sub-element.

In another embodiment, the configuration sub-module 30 according to the invention can be partly or wholly incorporated in the printer, for example in the printer 14 of the communication network 1 illustrated in FIG. 1.

All the storage, analysis, choosing and entry means can be incorporated in the printer 14 (illustrated in FIG. 2) and adapted to process the graphical instructions addressed by a print processor before these graphical instructions are actually translated by the driver, itself incorporated in the printer.

Figure 3:
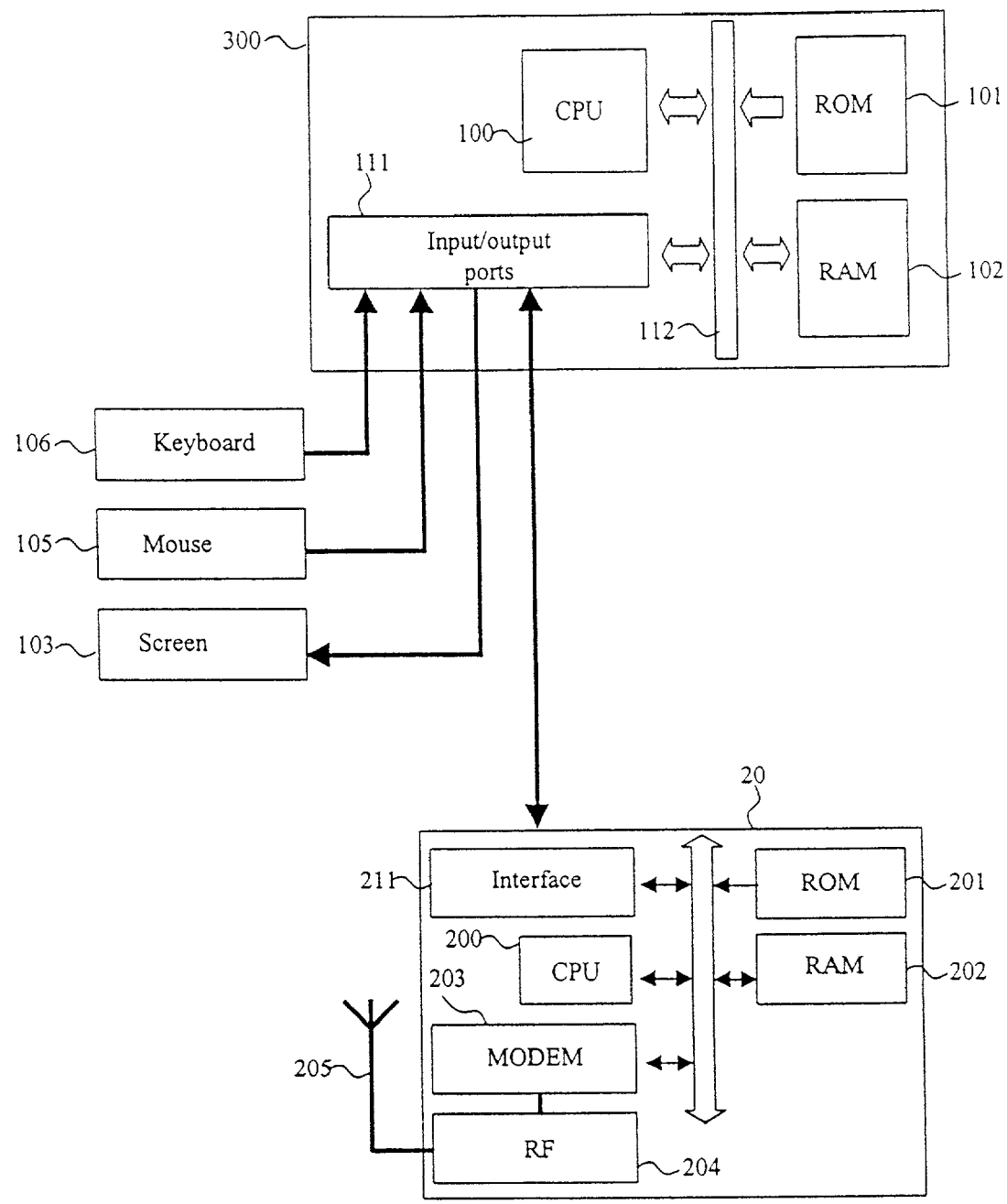
FIG. 3 depicts schematically a mobile printer associated with a radio module and implementing the present invention.

FIG. 3 illustrates a mobile printer 300 as described previously, associated with a radio module 20 in order to detect changes in geographical position. This module can, for example, be a DECT module serving to locate a mobile.

The radio module 20 is associated with the printer 300 by means of the input/output ports 111. It makes it possible to send and receive data in the form of electromagnetic waves.

The radio module 20 has a main data processing circuit (CPU) 200 associated with a read only memory (ROM) 201, a random access memory (RAM) 202 and a connection interface 211.

The read only memory 201 contains conventionally the operating programs of the main processing circuit 200.

The random access memory 202 temporarily stores the data received from another similar radio module connected to a wireless communication network such as the network 2 illustrated in FIG. 1; the random access memory 202 also stores the data processed by the main processing circuit 200. In particular the algorithm responsible for determining the geographical position of this module is executed when there is a change of cell, at the request of another communication device (for example the movable computer 10 or the radio module of another movable printer), at the request of a system administrator, or periodically. Moreover, a program called the SNMP ("Simple Network Management Protocol") agent, responsible for responding to SNMP requests, is continuously executed.

The random access memory 202 thus stores the geographical position of the module as determined by this algorithm.

The main data processing circuit 200 is connected to a modulation and de-modulation circuit or modem 203 converting the binary information streams into analog signals.

The modem 203 is connected to a radiofrequency stage 204, which provides the amplification of the signals and their frequency transposition. Finally, the radiofrequency stage 204 uses an antenna 205 for receiving and sending radio waves.

The radio module 20 also has an interface 211 which makes it possible to exchange data as well as control messages. In a particular embodiment, the interface 211 is an Ethernet interface. In particular, the computer 10 can request from the radio module 20 the instantaneous value of the quality of the radio channel by using the SNMP protocol. This instantaneous value is processed so as to obtain the value of the geographical position of the peripheral.

This mobile printer 300 equipped with the radio module 20 thus makes it possible to detect changes in bandwidth available on the wireless communication network 2 of FIG. 1 in order to update the configuration of the printers or to degrade the content of a document according to this available bandwidth.

The present invention thus makes it possible to know with precision the position of the printers present on a communication network, and therefore to choose the printer which is closest to (or furthest away from) a given place.

It applies, but non-limitatively, particularly well to a mobile computer, connected to a wireless communication network.

The present invention also makes it possible to automatically modify the configuration of the driver without acting directly on it.

Naturally, many modifications can be made to the example embodiment described above without departing from the scope of the invention.

Thus, the processing peripheral can also be a facsimile or a modem, or a scanner.

The number of configurations pre-recorded for each printer can be different.

In addition, the analysis step can include, in addition to the change of an indicator revealing the presence of a type of graphical instructions, a step of calculation of ratios, such as, for example, the ratio of the size of the image (in pixels) or of a graphic present in the document to the size of the print medium, so that, at the choosing step, the choice is made by taking into account both the value of the indicators and the value of these ratios.

Thus a value of the indicator IM of 1 can be ignored (that is to say the image configuration will not be chosen) if the ratio of the size of the image to the size of the paper is less than a certain value.

Figure 11:
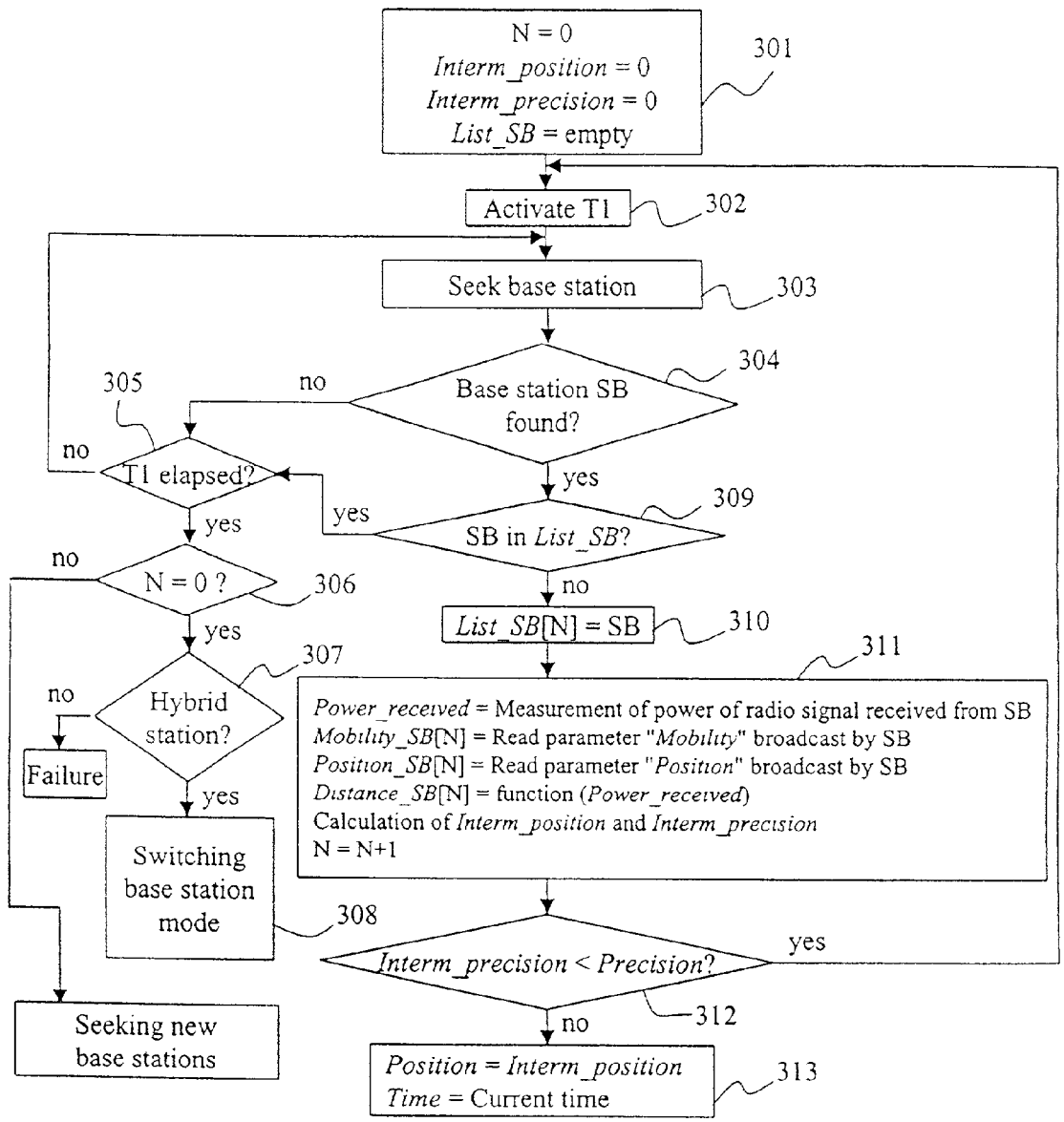
FIG. 11 is a flow diagram illustrating the steps performed by a mobile station in order to determine its position, in the case of the application of the present invention to a wireless telecommunications network.

In the context of the application of the invention to a wireless telecommunications network, FIG. 11 is a flow diagram depicting the succession of steps executed by a processing device, seen as a mobile communication station in this network, in order to determine its position.

The location procedure commences with the initialisation, during a step 301, of the variable N to 0, N being a temporary variable for counting the number of mobile stations, listed by a list "List_SM", which can hear a predetermined base station SB.

A temporary variable "Interm_position" serving to store an intermediate result of the calculation of the parameter "Position", designating the position of the base station, is also initialised to 0.

A temporary variable "Interm_precision", serving to calculate the precision obtained in the measurement of the position effected by the calculation of "Interm_position", is also initialised to 0.

At step 301, a temporary variable "List_SB", containing a list of base stations heard by the mobile communication station, contains no element.

During a step 302, a timer is initialised to a positive integer value and then activated. Its value decreases by one unit at each pulse of a clock or clock divider (that is to say a time counter where the frequency of the pulses is less than that of the clock). The period T1 during which its value is positive is known in advance. When its value reaches 0, its functioning is automatically stopped.

During a step 303, the mobile communication station then seeks, by listening to the DECT radio frequency band, which extends between 1880 MHz and 1900 MHz, the presence of at least one base station not already inventoried in "List_SB".

If no base station not already inventoried in "List_SB" is found before the elapse of time T1, that is to say, either if test 304 is negative and test 305 is positive, or if tests 304, and then 309 and 305 are positive, the processing unit of the mobile communication station then tests whether "List_SB" is empty, that is to say whether N is 0 (test 306).

If "List_SB" is empty and the communication station is a hybrid station, that is to say if tests 306 and 307 are positive, the communication station then switches into base station operating mode (step 308).

If "List_SB" is empty and the communication station is not a hybrid station, that is to say if test 306 is positive and test 307 is negative, the location procedure has failed since the communication station has no other station in its environment enabling it to locate itself.

If "List_SB" is not empty (test 306 negative), the communication station seeks new base stations in order to be able to measure its position.

If a base station is detected (test 304 positive), and is not yet contained in "List_SB" (test 309 negative), it is then added to this list at position N, during a step 310.

During a step 311, performed for each base station thus detected, the processing unit of the communication station can then calculate an intermediate position value in the following manner:

the radio unit of the communication station measures the power of the radio signal received from the base station "List_SB[N]" and stores the value measured in the variable "Received_power";

the radio unit listens for the value of the parameter "Mobility" broadcast by the base station "List_SB[N]" (for example, "FIXED" for fixed equipment such as a bulky printer, "PORTABLE", as in the case of a small printer, or "MOBILE", as in the case of a telephone) and stores it in the variable "Mobility_SB[N]";

the radio unit listens for the value of the parameter "Position" broadcast by the base station "List_SB[N]" and stores it in the variable "Position_SB[N]";

the processing unit of the communication station calculates the distance between the mobile communication station and the base station SB detected from the value of "Received_power" and stores the calculated value in "Distance_SB[N]";

from the parameters:
"Position_SB[Z]", Z=0 to N,
"Distance_SB[Z]", Z=0 to N,
"Mobility_SB[Z]", Z=0 to N, the processing unit of the mobile communication station can determine, for example by triangulation, an intermediate position "Interm_position", from the position and distance information, and define a confidence index from the mobility information, this confidence index being stored in "Interm_position", determining whether other distance measurements must be made: when the mobility information is equal to "FIXED" or "PORTABLE", "Interm_position" is incremented by 1 unit; otherwise "Interm_position" keeps the same value.

Then N is incremented by 1 unit.

The following equation exists between the power of the radio signal received and the distance between the mobile station receiving this signal and the base station sending the signal:

$$P_r = kP_t \left(\frac{\lambda}{4\pi D}\right)^\gamma,$$

where:
$P_r$ represents the value of the power received ("Received_power"),
k is a proportional factor,
$\lambda$ represents the radio wavelength,
$\gamma$ represents the propagation loss, and is equal to 2 in an open space, 3 in a space of the suburban area type and 3,5 in an urban area,
$P_t$ represents the transmitted power and is equal to 24 dBm in the case of a DECT base station, and
D represents the distance between the mobile station and the base station, that is to say here "Distance_SB[N]".

If the intermediate position obtained is sufficiently precise, that is to say if test 312 is negative, the value "Precision" being pre-determined, this position is then written in the read only memory of the mobile communication station in the variable "Position" during a step 313. This terminates the location procedure. The time at which the value of "Position" was obtained is then stored in "Time_Der".

In the case of the application of the invention to a telecommunications network of the cabled type, the geographical positions of the peripherals in the network can be stored in a table, on one of the servers connected to this network. This table can contain, for example, for each network address allocated to a peripheral, its geographical position. Advantageously, this information can be incorporated directly in a domain name server (DNS).

The updating of the information contained in this table can be carried out directly by the users of these peripherals, or by the communication network administrator. Preferably, the updating will take place when new peripherals are installed, or existing peripherals are moved.

In a preferred embodiment, each peripheral in the network will contain a GPS module; the information will be transmitted periodically to the domain name server.

The invention claimed is:

1. A method for managing resources of a wireless computer communication network, wherein said network comprises at least one base station and a plurality of processing devices as mobile stations, for processing a computer document stored on a processing control device connected by said network to at least one of said processing devices, said method comprising the steps of:

locating said processing devices in said network so as to obtain a position of each of said processing devices in said network, said locating step comprising a step of switching a station operating as a mobile station to a base station operating mode when there are an insufficient number of base stations in said network to perform said locating step; and a first selecting step of selecting, from among said plurality of processing devices, at least one processing device as a function of a group of position criteria relating to the position of said processing devices, so as to obtain a first selected group of processing devices.

2. The method according to claim 1, further comprising, after said first selection step, a second step of selecting, among said first selected group of processing devices, one processing device as a function of a group of operating criteria relating to the functioning of said processing devices.

3. The method according to claim 2, wherein said group of operating criteria includes parameters relating to the configuration capability of said processing devices.

4. The method according to claim 3, wherein the value of said parameters relating to the configuration capability is determined as a function of the content of said computer document to be processed.

5. The method according to claim 2, wherein said group of operating criteria includes characteristics chosen from among a type of processing devices, the ability to process a color file, the ability to process a file on both sides of a paper, a maximum resolution factor, a number of grey levels or a number of color shades, or a bandwidth available on the network.

6. The method according to claim 2, wherein said group of operating criteria includes a maximum number of documents awaiting processing.

7. The method according to claim 2 further comprising, after said second selection step, a step of automatic configuration of said one processing device.

8. The method according to claim 7, wherein the configuration step is performed as a function of content of said document to be processed.

9. The method according to claim 7 further comprising a step of analyzing content of said document to be processed before the configuration step.

10. The method according to claim 9 further comprising a step of translating the document to be processed in the form of graphical instructions before the analysis step.

11. The method according to claim 10, wherein the analysis step is performed using said graphical instructions.

12. The method according to claim 9 further comprising a step of choosing a correct configuration of the processing device.

13. The method according to claim 12, wherein the choosing step is performed using the results of the analysis of the document to be processed.

14. The method according to claim 12 further comprising a step of obtaining additional data before the step of choosing a correct configuration.

15. The method according to claim 14, wherein said obtaining step is performed by reading operating parameters of said processing device among at least a type of printing ink used and a type of paper.

16. The method according to claim 14, wherein said obtaining step is performed by interrogating a user on operating parameters of said processing device among at least a draft operating mode, a type of printing ink and a type of paper.

17. The method according to claim 14, wherein the configuration choosing step is adapted to choose said correct configuration among a set of prerecorded configurations for said processing device, dependent on the content of the document and additional data.

18. The method according to claim 17, wherein said set of prerecorded configurations includes at least a configuration for a draft operating mode, a configuration for the processing of images, a configuration for the processing of graphics, and a configuration for the processing of a text.

19. The method according to claim 18, wherein said set of prerecorded configurations includes subsets containing a configuration for a draft operating mode, a configuration for the processing of images, a configuration for the processing of graphics, and a configuration for the processing of a text, wherein each subset is defined for a unique combination of printing ink and paper type used.

20. The method according to claim 12, wherein the configuration choosing step is adapted to choose said correct configuration among a set of prerecorded configurations for said processing device, dependent on the content of the document.

21. The method according to claim 9, wherein the analysis step comprises steps according to which:
it is sought whether or not open graphical functions exist;
it is sought whether or not closed graphical functions exist;
it is sought whether or not representations in bitmap mode exist; and
it is sought whether or not text functions exist.

22. The method according to claim 1, wherein said group of position criteria includes characteristics chosen from among a place in which said processing device is situated, the device's proximity with respect to a given place, the device's distance with respect to a given place, or the device's distance with respect to said control device.

23. The method according to claim 1 wherein:
a search operation is performed, consisting of seeking the presence of at least one base station in an environment of said processing device;
if the presence of at least one base station is detected, for each base station detected, a measuring operation is performed, consisting of measuring the position of said processing devices and determining the precision of the measurement made;
and, if the precision of the measurement made is less than a predetermined value:
a change of mode request operation is performed, consisting of requesting a hybrid station operating in mobile station mode to switch into base station operating mode; and
a switching operation is performed, consisting of, for said hybrid station, switching from mobile station operating mode to base station operating mode, in order to constitute a new base station.

24. The method according to claim 23, wherein, during said measuring operation, the position of said processing devices which are mobile stations is measured from a plurality of information items transmitted by the detected base station.

25. The method according to claim 24, wherein, during said measuring operation, said plurality of information items includes a value of the power of the radio signal received from the base station.

26. The method according to claim 24, wherein said plurality of information items further includes a value of a mobility parameter broadcast by the base station.

27. The method according to claim 24, wherein said plurality of information items further includes a value of a position parameter broadcast by the base station.

28. The method according to claim 1, wherein content of said computer document is grouped together by page.

29. The method according to claim 1, wherein said processing includes a printing of said computer document, the processing device being a printer.

30. The method according to claim 1, wherein said processing includes a transfer of said computer document over a telephone communication network, wherein the processing devices are modems or facsimile machines.

31. The method according to claim 1, wherein said communication network is a local wireless network.

32. A system for managing resources of a wireless computer communication network, wherein said network comprises at least one base station and a plurality of processing devices as mobile stations, for processing a computer document stored on a processing control device connected by said network to at least one of said processing devices, said managing system comprising:
  a locating device that locates said processing devices in said network so as to obtain a position of each of said devices in said network, said locating device comprising a switching device that switches a station operating as a mobile station to a base station operating mode when there are an insufficient number of base stations in said network to perform the locating; and
  a first selecting device that selects, among said plurality of processing devices, at least one processing device as a function of a group of position criteria relating to the position of said processing devices, so as to obtain a first selected group of processing devices.

33. The system according to claim 32 further comprising a second selecting device that selects, among said first selected group of processing devices, one processing device as a function of a group of operating criteria relating to the functioning of said processing devices.

34. The system according to claim 33, wherein said group of operating criteria includes parameters relating to the configuration capability of said processing devices.

35. The system according to claim 34, wherein the value of said parameters relating to the configuration capability is determined as a function of the content of said computer document to be processed.

36. The system according to claim 33, wherein said group of operating criteria includes characteristics chosen from among a type of processing devices, the ability to process a color file, the ability to process a file on both sides of a paper, a maximum resolution factor, a number of grey levels or a number of color shades, or a bandwidth available on the network.

37. The system according to claim 33, wherein said group of operating criteria includes a maximum number of documents awaiting processing.

38. The system according to claim 33 further comprising a configuration device that automatically configures said one processing device.

39. The system according to claim 38, wherein the configuration device performs the configuration as a function of content of said document to be processed.

40. The system according to claim 38 further comprising an analyzing device that analyzes content of said document to be processed before the configuration.

41. The system according to claim 40 further comprising a data obtaining device that obtains additional data before choosing a correct configuration.

42. The system according to claim 38, wherein the configuration device is adapted to choose a correct configuration from among a set of prerecorded configurations for said processing device, dependent on the content of the document.

43. The system according to claim 38, wherein the configuration device is adapted to choose a correct configuration among a set of prerecorded configurations for said processing device, dependent on the content of the document and additional data.

44. The system according to claim 43, wherein said set of prerecorded configurations includes at least a configuration for a draft operating mode, a configuration for the processing of images, a configuration for the processing of graphics, and a configuration for the processing of a text.

45. The system according to claim 32, wherein said group of position criteria includes characteristics chosen from among a place in which said processing device is situated, the device's proximity with respect to a given place, the device's distance with respect to a given place, or the device's distance with respect to the control device.

46. A system according to claim 32 further comprising:
  a seeking device that seeks the presence of at least one base station in an environment of said processing device;
  a measuring device that, if the presence of at least one base station is detected, for each base station detected, measures the position of said processing devices and determines the precision of the measurement made;
  a mode changing device that requests a change of mode to request that a hybrid station operating in mobile station mode switch into base station operating mode if the precision of the measurement made is less than a predetermined value; and
  a switching device that enables said hybrid station to switch from the mobile station operating mode to the base station operating mode, in order to constitute a new base station.

47. The system according to claim 46, wherein said measuring device is adapted to measure the position of said processing devices which are mobile stations from a plurality of information items transmitted by the detected base station.

48. The system according to claim 47, wherein said plurality of information items includes a value of the power at the radio signal received from the base station.

49. The system according to claim 47, wherein said plurality of information items further includes a value of a mobility parameter broadcast by the base station.

50. The system according to claim 47, wherein said plurality of information items further includes a value of a position parameter broadcast by the base station.

51. The system according to claim 32, wherein said processing includes a printing of said computer document, the processing device being a printer.

52. The system according to claim 32, wherein said processing includes a transfer of said computer document over a telephone communication network, wherein the processing devices are modems or facsimile machines.

53. The system according to claim 32, wherein said communication network is a local wireless network.

54. A system according to claim 32, wherein the system comprises a wireless telecommunications network.

55. A mobile station in a wireless telecommunications network, comprising:
  a processor for executing computer executable process steps; and
  a memory storing computer executable process steps to be executed by the processor, the computer executable process steps comprising steps for executing a method for managing resources of a wireless computer communication network, wherein said network comprises at least one base station and a plurality of processing devices as mobile stations, for processing a computer document stored on a processing control device connected by said network to at least one of said processing devices, said method comprising the steps of (a) locating said processing devices in said network so as to obtain a position of each of said processing devices in said network, said locating step comprising a step of switching a station operating as a mobile station to a base station operating mode when there are an insufficient number of base stations in said network to perform said locating step, and (b) a first selecting step of selecting, from among said plurality of processing devices, at least one processing device as a function of a group of position criteria relating to the position of said processing devices, so as to obtain a first selected group of processing devices.

56. A base station in a wireless telecommunications network, comprising:
   a processor for executing computer executable process steps; and
   a memory storing computer executable process steps to be executed by the processor, the computer executable process steps comprising steps for executing a method for managing resources of a wireless computer communication network, wherein said network comprises at least one base station and a plurality of processing devices as mobile stations, for processing a computer document stored on a processing control device connected by said network to at least one of said processing devices, said method comprising the steps of (a) locating said processing devices in said network so as to obtain a position of each of said processing devices in said network, said locating step comprising a step of switching a station operating as a mobile station to a base station operating mode when there are an insufficient number of base stations in said network to perform said locating step, and (b) a first selecting step of selecting, from among said plurality of processing devices, at least one processing device as a function of a group of position criteria relating to the position of said processing devices, so as to obtain a first selected group of processing devices.

57. A computer-readable storage medium on which is stored computer-executable codes of a computer program, said program comprising computer executable process steps implementing a method for managing resources of a wireless computer communication network, wherein said network comprises at least one base station and a plurality of processing devices as mobile stations, for processing a computer document stored on a processing control device connected by said network to at least one of said processing devices, said method comprising the steps of:
   locating said processing devices in said network so as to obtain a position of each of said processing devices in said network, said locating step comprising a step of switching a station operating as a mobile station to a base station operating mode when there are an insufficient number of base stations in said network to perform said locating step; and
   a first selecting step of selecting, from among said plurality of processing devices, at least one processing device as a function of a group of position criteria relating to the position of said processing devices, so as to obtain a first selected group of processing devices.

* * * * *

UNITED STATES PATENT AND TRADEMARK OFFICE
CERTIFICATE OF CORRECTION

PATENT NO. : 7,065,592 B2
APPLICATION NO. : 09/756702
DATED : June 20, 2006
INVENTOR(S) : Stephane Amarger et al.

It is certified that error appears in the above-identified patent and that said Letters Patent is hereby corrected as shown below:

COLUMN 2:
Line 12, "possible" should read -- possibly --; and
Line 60, "is" should read -- it --.

COLUMN 9:
Line 14, "and $w_i$," should read -- and $w_i$ --.

COLUMN 11:
Line 23, "printing proper" should read -- proper printing --.

COLUMN 12:
Line 22, "storage El" should read -- storage E1 --.

COLUMN 13:
Line 16, "rapid." should read -- rapidly --.

COLUMN 16:
Line 59, "variable" should read -- variables --.

COLUMN 18:
Line 26, "3,5 in" should read -- 3.5 in --.

Signed and Sealed this

Twenty-sixth Day of June, 2007

JON W. DUDAS
*Director of the United States Patent and Trademark Office*